US012570846B2

(12) United States Patent
Ivanova et al.

(10) Patent No.: US 12,570,846 B2
(45) Date of Patent: Mar. 10, 2026

(54) POLYMER COMPOSITION

(71) Applicant: SYNTHOMER (UK) LIMITED, Essex (GB)

(72) Inventors: Julija Ivanova, Harlow (GB); Natalie Blainey-Lang, Harlow (GB); Stacey Syron, Harlow (GB)

(73) Assignee: SYNTHOMER (UK) LIMITED, Harlow (GB)

(*) Notice: Subject to any disclaimer, the term of this patent is extended or adjusted under 35 U.S.C. 154(b) by 0 days.

(21) Appl. No.: 18/837,397

(22) PCT Filed: Feb. 22, 2023

(86) PCT No.: PCT/GB2023/050406
§ 371 (c)(1),
(2) Date: Aug. 9, 2024

(87) PCT Pub. No.: WO2023/161631
PCT Pub. Date: Aug. 31, 2023

(65) Prior Publication Data

US 2025/0145818 A1 May 8, 2025

(30) Foreign Application Priority Data

Feb. 23, 2022 (GB) ..................................... 2202472

(51) Int. Cl.

| | |
|---|---|
| ***C08L 31/04*** | (2006.01) |
| ***B29B 11/10*** | (2006.01) |
| ***B29C 64/314*** | (2017.01) |
| ***C08F 16/06*** | (2006.01) |
| ***C08K 5/51*** | (2006.01) |
| ***C08K 5/527*** | (2006.01) |
| ***C08L 29/04*** | (2006.01) |
| *B33Y 70/00* | (2020.01) |
| *B33Y 80/00* | (2015.01) |

(52) U.S. Cl.
CPC .............. *C08L 31/04* (2013.01); *B29B 11/10* (2013.01); *B29C 64/314* (2017.08); *C08F 16/06* (2013.01); *C08K 5/51* (2013.01); *C08K 5/527* (2013.01); *C08L 29/04* (2013.01); *B33Y 70/00* (2014.12); *B33Y 80/00* (2014.12)

(58) Field of Classification Search
CPC ........ C08L 31/04; C08L 29/04; B29C 64/314; B29B 11/10; C08F 16/06; C08K 5/51; C08K 5/527; B33Y 70/00; B33Y 80/00
USPC .............................................................. 524/1
See application file for complete search history.

(56) References Cited

U.S. PATENT DOCUMENTS

| | | | |
|---|---|---|---|
| 2004/0058178 A1 | 3/2004 | Yang et al. | |
| 2005/0001348 A1 | 1/2005 | Kohnen et al. | |
| 2020/0055256 A1 | 2/2020 | Kumaki et al. | |

FOREIGN PATENT DOCUMENTS

| | | | | |
|---|---|---|---|---|
| CN | 103980705 A | 8/2014 | | |
| CN | 103980705 B | 2/2016 | | |
| CN | 109251455 A | 1/2019 | | |
| CN | 109337270 A | 2/2019 | | |
| CN | 111100409 A * | 5/2020 | ................ | C08J 5/18 |
| WO | WO 2004/024810 A2 | 3/2004 | | |
| WO | WO 2013/192326 A1 | 12/2013 | | |
| WO | WO 2014/205191 A1 | 12/2014 | | |
| WO | WO 2023/161631 A1 | 8/2023 | | |

OTHER PUBLICATIONS

Global Industry Trade Shanghai Ltd., Products webpage—Polyvinyl Alcohol CAS No. 9002-89-5, 2 pages (2023).
McKinn International Pte Ltd, Product Specification—Polyvinyl Alcohol CAS No. 9002-89-5, 2 pages (2020).
International Search Report and Written Opinion for International Application No. PCT/GB2023/050406 mailed May 19, 2023, 10 pages.
Astm D638-14 Standard Test Method for Tensile Properties of Plastics, (2014).
Database Chemical Abstracts Service Accession No. 2014:1350027, Li, Zhibo et al., "Polyimide molding powder material for 3D printing", XP002809178, (2014).
Database Chemical Abstracts Service Accession No. 2019:293521, Jiao, Guoping et al., "Polyvinyl alcohol-based composite coated-nano TiO2 fresh-keeping packaging material", XP002809179, (2019).
Database Chemical Abstracts Service Accession No. 2020:850347, Chang, Jiang "Preparation method of high-temperature water-soluble polyvinyl alcohol composition and particle capable of melt casting and film formation", XP002809180, (2020).
ISO 527-2:2012—Plastics—Determination of tensile properties (Edition 2, 2012).
ISO 15512:2019—Plastics—Determination of water content (Edition 5, 2019).
Moritani et al., "$^{13}$C- and $^{1}$H-NMR Investigations of Sequence Distribution in Vinyl Alcohol-Vinyl Acetate Copolymers", *Macromolecules* 10(3):532-535 (1977).

* cited by examiner

*Primary Examiner* — Joseph S Del Sole
*Assistant Examiner* — Ronald Grinsted
(74) *Attorney, Agent, or Firm* — Brian C. Trinque; Lathrop GPM LLP

(57) ABSTRACT

The present disclosure provides polyvinyl alcohol-based polymer compositions. One aspect provides a polymer composition comprising about 60 to about 99% by weight of a polymer (A), about 0.05 to about 10% by weight of a phosphite, at least one additive selected from vitamin E and epoxidised soy bean oil, and about 0 to about 10% by weight of a PEG-grafted polyvinyl acetate copolymer. Processes for preparation of said polymer composition as well as uses thereof and articles prepared therefrom are also provided.

33 Claims, No Drawings

POLYMER COMPOSITION

RELATED APPLICATIONS

This application is a 35 U.S.C. § 371 filing of International Application No. PCT/GB2023/050406, filed Feb. 22, 2023, which application claims priority to Great Britain Patent Application No. 2202472.3, filed Feb. 23, 2022. The entire contents of these applications are herein incorporated by reference in their entireties.

FIELD

The present disclosure relates generally to polymer compositions, and more particularly, to polymer compositions comprising a polymer and additives suitable for applications in, but not limited to, 3-D printing, packaging, films, coatings, and water-soluble tooling. The present disclosure also provides processes for the preparation and uses of the inventive compositions.

BACKGROUND

Synthetic polymers, i.e. plastics, are used ubiquitously in all aspects of industry and consumer goods due to their ease of processing, durability and the broad spectrum of physical properties that can be obtained from different polymer chemistries. Thermoplastics are polymers that become pliable and mouldable above a certain elevated temperature and which become solidified when cooled. They are particularly useful because these properties allow them to be used in processes such as injection moulding, compression moulding, calendering and extrusion. For similar reasons, thermoplastics have also been widely adopted for use in 3-D printing.

3-D printing refers to the process of constructing three-dimensional objects from a digital model; it is sometimes referred to as 'additive manufacturing'. The term encompasses a number of processes whereby material is deposited, joined, or solidified under computer control to create a three-dimensional object. The material is typically added together in a layer-by-layer fashion. 3-D printing has commonly been used for prototyping, particularly in industry, but has also been increasingly adopted for amateur use. Moreover, some 3-D printing processes have advanced to the point where large-scale industrial production may be viable. 3-D printing is particularly advantageous for the production of complex 3-D shapes or geometries that may be difficult to produce by other methods such as machining (sometimes referred to in the field as 'subtractive manufacturing', i.e. where the removal of material is the common process).

While 3-D printing approaches have been applied to a variety of different materials, 3-D printing processes predominantly use polymers due to the ease of manufacturing and handling of such materials. One of the most common 3-D printing processes is fused deposition modelling (also called fused filament fabrication), which uses a continuous filament of a thermoplastic material. Similarly, in fused granulate fabrication, granular polymers are melted and fed through a nozzle. For such 3-D printing processes, there is a need for thermoplastic polymer compositions having properties compatible with all stages of the formulation process such as the production of granules, pellets and filaments, as well as the 3-D printing process, while also having physical and chemical properties appropriate for the intended use of the final printed object.

While thermoplastics are particularly useful for manufacturing, the remarkable durability of synthetic polymers means that they can persist in the natural environment for many hundreds of years. In particular, plastic debris having a length less than about five millimetres, commonly referred to as 'microplastics', are a growing environmental concern, as such particles enter natural ecosystems from various man-made sources such as cosmetics, clothing, and industrial processes where they accumulate and cause harm, for example to aquatic life in the oceans.

There is thus a growing demand for the use of more environmentally friendly polymers in the manufacture of consumer objects that are easily recyclable or readily degradable at the end of the useful lifetime of the manufactured object. Similarly, there is demand for more ecologically friendly packaging materials such as polymer films. In this respect, polyvinyl alcohol is particularly attractive because it is water-soluble and in solution is broken down to carbon dioxide and water by the action of microorganisms typically found in municipal wastewater systems. Polyvinyl alcohol is also thermoplastic, injection mouldable and extrudable. Additionally, the water-solubility of polyvinyl alcohol makes it particularly attractive for certain 3-D printing processes that use a soluble scaffold. In such processes, a sacrificial support structure is produced as part of the printing process to enable the printing of complex geometric parts, for example objects having angles greater than 45 degrees or overhangs. At the end of the printing process, the support scaffold can be removed, for example by immersing the printed object in water until the support scaffold is dissolved away from the structure of the final product.

Manufacturing with polyvinyl alcohols remains complex, however. In particular, the thermoplastic processing of pure polyvinyl alcohol is confounded by undesirable characteristics such as poor flow and thermal degradation/decomposition. Thus, there is a need for polyvinyl alcohol formulations that have one or more of the following properties: good melt and flow characteristics, resistance to thermal degradation/decomposition and/or discoloration during multiple processing steps of formulation and 3-D printing processes, good cold-water solubility, and compatibility with common 3-D printing processes such as fused deposition modelling, which includes both fused filament fabrication and fused granulate fabrication. The polymer compositions of the present disclosure seek to address this need.

SUMMARY

In a first aspect, the present disclosure provides a polymer composition comprising, based in each case on the total weight of said polymer composition:

(a) about 60 to about 99% by weight of a polymer (A), wherein polymer (A) comprises, based in each case on the total number of moles of polymer (A):

(i) from about 66 to about 79 mole % of structural units of formula (I):

(I)

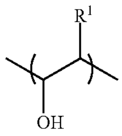
;

and (ii) from about 10 to about 34 mole % of structural units of formula (II):

(II)

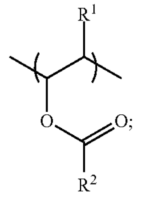

wherein each $R^1$ is independently hydrogen or alkyl, each $R^2$ is independently alkyl; and wherein the polymer (A) has a weight average molecular weight (Mw) of from about 26,000 to about 87,000 and a number average molecular weight (Mn) of from about 4,000 to about 45,000;

(b) about 0.05 to about 10% by weight of a phosphite selected from the group consisting of formula (V):

(V)

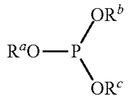

and formula (VI):

(VI)

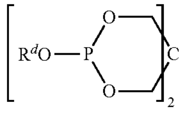

wherein $R^a$, $R^b$, $R^c$, and $R^d$ are each independently hydrocarbyl;

(c) at least one additive selected from:

(i) vitamin E; and (ii) epoxidised soy bean oil; and (d) about 0 to about 10% by weight of a PEG-grafted polyvinyl acetate copolymer, wherein the polyvinyl acetate copolymer has a degree of hydrolysis of from about 30 to about 98 mole %, a weight average molecular weight (Mw) of from about 5,000 to about 40,000, and a number average molecular weight (Mn) of from about 1,000 to about 20,000.

In a further aspect the present disclosure provides a polymer composition comprising, based in each case on the total weight of said polymer composition:

(a) about 60 to about 99% by weight of a polymer (A) which is a polyvinyl alcohol having a degree of hydrolysis of from about 66 to about 79%, wherein the polymer (A) has a weight average molecular weight (Mw) of from about 26,000 to about 87,000 and a number average molecular weight (Mn) of from about 4,000 to about 45,000; and components (b), (c), and (d) as defined in the first aspect above.

In a further aspect, the present disclosure provides for the use of the composition described herein in 3-D printing. A yet further aspect provides for the use of the composition described herein in fused deposition moulding, and another aspect provides for the use of the composition described herein in fused granulate fabrication. Another aspect provides for the use of the composition described herein as a water-soluble support in 3-D printing. A further aspect provides for the use of the composition described herein in packaging, films, coatings, or water-soluble tooling.

The present disclosure further provides in one aspect a water-soluble support for 3-D printing comprising a composition as described herein.

Also provided in one aspect is a process for preparing the composition described herein, said process comprising forming a pre-mix of components (a) to (d) as defined herein, and extruding said pre-mix through a die.

A further aspect provides a process for preparing a filament, said process comprising extruding pellets prepared by the processes described herein from a single screw extruder.

In another aspect, 3-D printed articles prepared from the composition described herein are also provided.

Further aspects and embodiments of the invention are set out in the appended independent and dependent claims. It will be appreciated that features of the dependent claims may be combined with each other and with features of the independent claims in combinations other than those explicitly set out in the claims. Furthermore, the approaches described herein are not restricted to specific embodiments such as those set out below, but include and contemplate any combinations of features presented herein. The foregoing and other objects, features, and advantages of the present disclosure will appear more fully hereinafter from a consideration of the detailed description that follows.

DETAILED DESCRIPTION

While various exemplary embodiments are described or suggested herein, other exemplary embodiments utilizing a variety of methods and materials similar or equivalent to those described or suggested herein are encompassed by the general inventive concepts. Aspects and features of apparatus and methods described herein which are not described in detail may be implemented in accordance with any conventional techniques for implementing such aspects and features.

As used in this specification and the claims, the singular forms “a,” “an,” and “the” include plural referents unless the context clearly dictates otherwise.

In this specification, unless otherwise stated, the term “about” modifying the quantity of a component refers to variation in the numerical quantity that can occur, for example, through typical measuring and handling procedures used for making concentrates, mixtures or solutions in the real world; through inadvertent error in these procedures; through differences in the manufacture, source, or purity of the materials employed, or to carry out the methods; and the like. The term “about” also encompasses amounts that differ due to different equilibrium conditions for a composition resulting from a particular initial mixture. Whether or not modified by the term “about”, the claims include equivalents to the quantities.

The ranges provided herein provide exemplary amounts of each of the components. Each of these ranges may be taken alone or combined with one or more other component ranges.

As used herein, the term “at least” includes the end value of the range that is specified. For example, “at least 10 cm” includes the value 10 cm.

As used herein, wt % means "weight percentage" as the basis for calculating a percentage. Unless indicated otherwise, all % values are calculated on a weight basis, and are provided with reference to the total weight of the product in which the substance is present.

As used herein, "substantially free" means no more than trace amounts, i.e. the amount of the substance(s) concerned is negligible. In one embodiment, "substantially free" means no more than 1000 ppm, preferably no more than 100 ppm, more preferably no more than 10 ppm, even more preferably no more than 1 ppm of the substance(s) concerned.

As used herein, the term "hydrocarbyl" refers to a group comprising at least C and H. If the hydrocarbyl group comprises more than one C then those carbons need not necessarily be linked to each other. For example, at least two of the carbons may be linked via a suitable element or group. Thus, the hydrocarbyl group may contain heteroatoms. Suitable heteroatoms will be apparent to those skilled in the art and include, for instance, sulphur, nitrogen, oxygen, phosphorus and silicon. Non-limiting examples of such hydrocarbyls are alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof; cycloalkyl groups, such as cyclopropyl, cyclobutyl, cyclopentyl, cyclohexyl, cycloheptyl, cycloocytyl, 2-methylcyclopentyl, 2,3-dimethyl-cyclobutyl, 4-methylcyclobutyl, 3-cyclopentylpropyl, and the like; cycloalkenyl groups, such as cyclobutenyl, cyclopentenyl, cyclohexenyl, cycloheptenyl, cyclooctenyl, and the like, and isomeric forms thereof; cycloalkadienyl groups, such as cyclopentadientyl, cyclohexadienyl, cycloheptadienyl, and the like; aryl groups, such as phenyl, tolyl, xylyl, naphthyl, biphenylyl, and the like; aralkyl groups, such as benzyl, phenethyl, phenpropyl, naphthmethyl, and the like. Preferably, the hydrocarbyl group is an aryl, heteroaryl, alkyl, cycloalkyl, aralkyl or alkenyl group. Preferably, the alkyl group is a $C_{1-12}$-alkyl, more preferably a $C_{1-6}$-alkyl group.

The general inventive concept described herein is centred on providing a polyvinyl alcohol-based polymer composition comprising an additive package wherein said composition is suitable for use in, but not limited to, 3-D printing, packaging, films, coatings, and water-soluble tooling as well as being suitable for compounding as a raw material for the foregoing, for example in the form of pellets, granules and filaments.

In a first aspect, the present disclosure provides a polymer composition comprising a polymer (A) as described herein, a phosphite and at least one additive selected from vitamin E and epoxidised soy bean oil.

Polymer (A)

The polymer composition of the present disclosure may comprise about 60 to about 99% by weight of polymer (A), based on the total weight of said composition. In one preferred embodiment, the polymer composition of the present disclosure comprises from about 90 to about 99 weight %, or from about 95 to about 99 weight % of polymer (A).

Polymer (A) of the present disclosure may be described as a polyvinyl alcohol (sometimes abbreviated as PVOH or PVA). Polyvinyl alcohol is a synthetic, water-soluble polymer having the following formula, where n is an integer:

$$[CH_2CH(OH)]_n$$

Polyvinyl alcohol is a commercially available material, and is sold for example under the trade names Alcotex® and POVAL™. In the main industrial method for manufacturing polyvinyl alcohol, polyvinyl acetate (PVAc) is first manufactured by radical polymerisation of vinyl acetate. The resulting polyvinyl acetate is then hydrolysed under alkaline conditions, typically using methanol as a solvent, to produce polyvinyl alcohol. The hydrolysis process may also be referred to as a saponification process and both terms can be used interchangeably. Accordingly, it will be immediately apparent that polyvinyl alcohol can be produced by this process with varying degrees of hydrolysis, that is to say that the polyvinyl alcohol may be characterised with regard to the extent of hydrolysis of the acetate groups in the polyvinyl acetate starting material.

Thus, the term "polyvinyl alcohol" as used herein has its usual meaning in the field of the present disclosure, i.e. it encompasses hydrolysis products of polyvinyl acetate having varying degrees of hydrolysis and is not limited to polymers comprising only $[CH_2CH(OH)]$ structural repeat units. Rather, polyvinyl alcohols may also comprise various proportions of residual vinyl acetate repeat units. Accordingly, the terms "polyvinyl alcohol" and "[partially] hydrolysed polyvinyl acetate" may be used interchangeably for the purposes of the present disclosure.

The degree of hydrolysis of polyvinyl alcohol is the proportion of the vinyl alcohol unit in all the repeat units of the polymer, expressed in mole %. Thus, where the general structure of polyvinyl alcohol is:

$$—[CH_2CH(OH)]_n—[CH_2CH(OAc)]_m$$

n being the amount of vinyl alcohol repeat units in moles, and m being the amount of vinyl acetate repeat units in moles, the degree of hydrolysis can be expressed by the formula:

$$\text{Degree of hydrolysis (mole \%)} = \frac{n}{m+n} \times 100$$

Qualitative descriptors of the degree of hydrolysis are also commonly used in the field of the present disclosure. For example, the terms "partially hydrolysed polyvinyl alcohol" and "fully hydrolysed polyvinyl alcohol" are commonly used in the field of the art of the present disclosure. There is, however, no commonly agreed cut-off between the two terms based on the mole % degree of hydrolysis. Notwithstanding the foregoing, and solely for the purposes of illustration, in the USA the Toxic Substances Control Act defines fully hydrolysed polyvinyl alcohol as corresponding to a degree of hydrolysis of equal to or greater than 98 mole %.

Polyvinyl alcohols, such as polymer (A) of the present disclosure, may also be characterised as comprising varying proportions of structural units (repeat units denoted herein by curved parentheses) of formula (I):

(I)

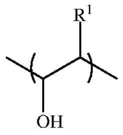

and formula (II):

(II)

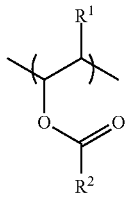

wherein each $R_1$ is independently hydrogen or alkyl and each $R_2$ is independently alkyl, more preferably $C_1$-$C_6$ alkyl. A polymer comprising from about 66 to about 79 mole % of structural units of formula (I) as defined above would thus have a degree of hydrolysis of from about 66 to about 79 mole %.

Polyvinyl alcohols may also comprise structural units other than those of formula (I) and formula (II) depicted above. Polyvinyl alcohols may, for example comprise unsaturated groups such as carbon-carbon double bonds and carbonyl groups. Without wishing to be bound by theory, such unsaturated groups may arise due to degradation of the polymer, for example during processing and in particular thermal processing. Oxidation of the hydroxyl groups of the polyvinyl alcohol, for example, gives rise to carbonyl groups. The hydroxyl and acetate groups of the polyvinyl alcohol may also undergo elimination reactions producing water and acetic acid respectively, and giving rise to the presence of carbon-carbon double bonds in the polymer backbone. Such unsaturated groups are typically conjugated and can thus lead to discolouration of the polymer, which is generally undesirable.

Unsaturated groups may also be present as a consequence of the process of radical polymerisation of vinyl acetate used to prepare the polyvinyl acetate starting material that is subsequently (partially) hydrolysed to produce the polyvinyl alcohol/polymer (A) of the present disclosure. Carbonyl groups may, for example, be introduced to the end of the polymer if an aliphatic aldehyde such as acetaldehyde is present during the radical polymerisation process. Conjugated polyene structures may also be present, and these may be introduced by subsequent hydrolysis and heat-treatment processes. The conjugated groups give rise to UV absorption peaks at around 230 nm, 280 nm, and 330 nm, which depend on the length of the polyene group. The amount of unsaturated groups present in the polymer (A) may be determined by UV-visible spectrophotometry, as commonly practiced in the art.

Thus, polyvinyl alcohols such as polymer (A) of the present disclosure may further comprise structural units of formula (III):

(III)

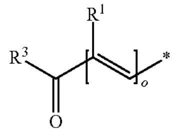

wherein $R^1$ is as defined above; $R^3$ is H or alkyl, preferably H or Me; and o is 0, 1, 2, or 3; where the asterisk indicates a point of attachment to the polyvinyl alcohol chain as defined herein. The polymer (A) may, for example, comprise from about 0 to about 2 mole %, from about 0 to about 1.5 mole %, from about 0 to about 1 mole %, from about 0 to about 0.5 mole %, or from about 0 to about 0.1 mole % of structural units of formula (III). In another preferred embodiment, the polymer (A) may be substantially free of structural units of formula (III). In another preferred embodiment, the polymer (A) may comprise from about 0.1 to about 2 mole %, from about 0.1 to about 1 mole %, or from about 0.1 to about 0.5 mole % of structural units of formula (III).

The polymer composition of the present disclosure may comprise about 60 to about 99% by weight of a polymer (A), based on the total weight of the polymer composition, wherein polymer (A) comprises, based in each case on the number of moles of polymer (A):

(i) from about 66 to about 79 mole % of structural units of formula (I):

(I)

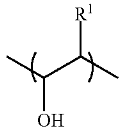

;

and (ii) from about 10 to about 34 mole % of structural units of formula (II):

(II)

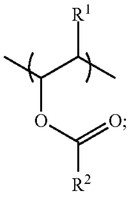

;

(iii) from about 0 to about 2 mole % of structural units of formula (III):

(III)

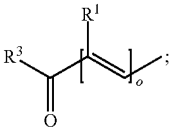

;

wherein each $R^1$ is independently hydrogen or alkyl; each $R^2$ is independently alkyl; $R^3$ is H or alkyl, preferably H or Me; and o is 0, 1, 2, or 3.

In one preferred embodiment, each $R^1$ is independently hydrogen or alkyl, more preferably H or $C_1$-$C_6$ alkyl. In one preferred embodiment, $R^1$ is independently hydrogen, methyl, ethyl, propyl, butyl, pentanyl, hexyl, or isomers thereof. In another preferred embodiment, $R^1$ is H. In one embodiment, $R^2$ is independently $C_1$-$C_6$ alkyl, more preferably, methyl, ethyl, propyl, butyl, pentanyl, hexyl, or isomers thereof. In a preferred embodiment, $R^2$ is Me. In another preferred embodiment, $R^1$ is H and $R^2$ is Me.

As discussed above, polyvinyl alcohols may be characterised in terms of their degree of hydrolysis, said parameter corresponding to the proportion of alcohol repeat units in the polymer. Thus in one preferred embodiment of the present disclosure the polymer (A) comprises from about 70.0 to about 74.0 mole %, preferably 71.5 to about 73.5 mole % of structural units of formula (I). In another preferred embodiment, the polymer (A) comprises from about 75.0 to about 79.0 mole %, preferably from about 76.0 to about 79.0 mole % of structural units of formula (I). Suitable polymers are commercially available.

In one preferred embodiment, the polymer (A) comprises from about 66 to about 79 mole % of structural units of formula (I) and from about 21 mole % to about 34 mole % of structural units of formula (II). In another preferred embodiment, the polymer (A) consists essentially of from about 66 to about 79 mole % of structural units of formula (I) and from about 21 mole % to about 34 mole % of structural units of formula (II). In another preferred embodiment, the polymer (A) consists of from about 66 to about 79 mole % of structural units of formula (I) and from about 21 mole % to about 34 mole % of structural units of formula (II).

In another preferred embodiment, the polymer (A) comprises from about 70.0 to about 74.0 mole % of structural units of formula (I) and from about 26.0 to about 30.0 mole % of structural units of formula (II). In another preferred embodiment, the polymer (A) consists essentially of from about 70.0 to about 74.0 mole % of structural units of formula (I) and from about 26.0 mole % to about 30.0 mole % of structural units of formula (II). In another preferred embodiment, the polymer (A) consists of from about 70.0 to about 74.0 mole % of structural units of formula (I) and from about 26.0 mole % to about 30.0 mole % of structural units of formula (II).

In another preferred embodiment, the polymer (A) comprises from about 71.5 to about 73.5 mole % of structural units of formula (I) and from about 26.5 to about 28.5 mole % of structural units of formula (II). In another preferred embodiment, the polymer (A) consists essentially of from about 71.5 to about 73.5 mole % of structural units of formula (I) and from about 26.5 mole % to about 28.5 mole % of structural units of formula (II). In another preferred embodiment, the polymer (A) consists of from about 71.5 to about 73.5 mole % of structural units of formula (I) and from about 26.5 mole % to about 28.5 mole % of structural units of formula (II).

In another preferred embodiment, the polymer (A) comprises from about 75.0 to about 79.0 mole % of structural units of formula (I) and from about 21.0 to about 25.0 mole % of structural units of formula (II). In another preferred embodiment, the polymer (A) consists essentially of from about 75.0 to about 79.0 mole % of structural units of formula (I) and from about 21.0 mole % to about 25.0 mole % of structural units of formula (II). In another preferred embodiment, the polymer (A) consists of from about 75.0 to about 79.0 mole % of structural units of formula (I) and from about 21.0 mole % to about 25.0 mole % of structural units of formula (II).

In another preferred embodiment, the polymer (A) comprises from about 76.0 to about 79.0 mole % of structural units of formula (I) and from about 21.0 to about 24.0 mole % of structural units of formula (II). In another preferred embodiment, the polymer (A) consists essentially of from about 76.0 to about 79.0 mole % of structural units of formula (I) and from about 21.0 mole % to about 24.0 mole % of structural units of formula (II). In another preferred embodiment, the polymer (A) consists of from about 76.0 to about 79.0 mole % of structural units of formula (I) and from about 21.0 mole % to about 24.0 mole % of structural units of formula (II).

In the present disclosure, the polymer (A) has a weight average molecular weight (Mw) of from about 26,000 to about 87,000 and a number average molecular weight (Mn) of from about 4,000 to about 45,000. A person skilled in the art will understand that the polydispersity (index), or PDI, of a polymer may be calculated from the Mw and Mn using the following formula:

$$PDI = \frac{Mw}{Mn}$$

In one preferred embodiment, the polymer (A) is further characterised in having a peak molecular weight (Mp) of from about 24,000 to about 40,000. The molecular weight of the polymer (A) may be determined by gel permeation chromatography (GPC) using polystyrene standards. A person skilled in the art will able to select suitable parameters. For example, the molecular weight of the polymer (A) may be determined at a flow rate of 1 mL $min^{-1}$ and a temperature of 40° C. in tetrahydrofuran as the solvent on Agilent PLgel mixed B (300×7.5 mm, 10 μm) columns against Agilent EasiVial PS-H polystyrene standards. The skilled person will be aware that polyvinyl alcohols must first be reacetylated before GPC analysis is performed. This reacetylation increases the molecular weight by a factor determined by the original degree of hydrolysis, and thus to obtain the molecular weight of the polyvinyl alcohol, the molecular weight obtained from GPC analysis must be divided by the appropriate factor corresponding to the original degree of hydrolysis. A person skilled in the art will be able to determine the appropriate factor. For example, the correction factor for a polyvinyl alcohol with a degree of hydrolysis of 74% is 1.57, and the correction factor for a polyvinyl alcohol with a degree of hydrolysis of 77.8% is 1.61.

The polymer (A) may also comprise trace amounts of 1,2-glycol bonds, that is the polymer (A) may further comprise structural units of formula (IV):

(IV)

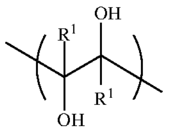

wherein $R^1$ is as defined above. Without wishing to be bound by theory, such 1,2-glycol bonds are believed to arise due to trace amounts of head-to-tail:tail-to-head addition of vinyl acetate during the radical polymerisation of vinyl acetate to from the polyvinyl acetate from which the polyvinyl alcohol, polymer (A) is prepared. In one preferred embodiment, the polymer (A) may comprise from about 0 to about 2 mole %, from about 0 to about 1 mole %, from about 0 to about 0.5 mole %, or from about 0 to about 0.1 mole % of structural units of formula (IV). In another preferred embodiment, the polymer (A) may be substantially free of structural units of formula (IV).

As described above, polyvinyl alcohols comprise alcohol and acetate repeat units, i.e. structural units of formula (I) and formula (II)). A person skilled in the art will recognise that different arrangements of the alcohol and acetate repeat units within the polymer chain are possible. For example, the alcohol and acetate repeat units may be randomly distributed within the polymer chain, or like repeat units may be clustered together in blocks, as depicted schematically below:

A-B-A-B-A-B-A-B-A [random]

A-A-A-B-B-B-A-A-A [block]

Thus, the polymer (A) of the present disclosure may have a random or block distribution of structural units of formula (II). The present disclosure is not limited in this respect and all distributions of structural units of formula (II) are contemplated herein. Methods for measuring the distribution of residual acetate groups in polyvinyl alcohols will be known to a person skilled in the art. Briefly, the distribution may be indirectly measured via iodine absorbance or melting point. In another preferred embodiment, the distribution of structural units of formula (II) is measured by nuclear magnetic resonance (NMR) spectroscopy as described by Moritani and Fujiwara (*Macromolecules* (1977), 10: 532-535), which is incorporated herein by reference.

Polymer (A) can be defined alternatively as a polyvinyl alcohol having a degree of hydrolysis of from about 66 to about 79 mole %.

Thus, in one aspect, the invention relates to a polymer composition comprising (a) about 60 to about 99% by weight of a polyvinyl alcohol having a degree of hydrolysis of from about 66 to about 79 mole % and having a weight average molecular weight (Mw) of from about 26,000 to about 87,000 and a number average molecular weight (Mn) of from about 4,000 to about 45,000; and components (b)-(d) as defined above. In this aspect, preferably polymer (A) is a polyvinyl alcohol having a degree of hydrolysis of from about 70 to about 74 mole %, more preferably from about 71.5 to about 73.5 mole %. In an alternative preferred embodiment, polymer (A) is a polyvinyl alcohol having a degree of hydrolysis of from about 75.0 to about 79.0 mole %, more preferably from about 76.0 to about 79.0 mole %.

The polymer composition of the present disclosure also comprises additives, namely about 0.05 to about 10% by weight of a phosphite as disclosed herein and at least one additive selected from vitamin E and epoxidised soy bean oil. The polymer composition of the present disclosure may further comprise one or more additives as disclosed herein. The additives of the present disclosure can be considered collectively as an additive package, such that an additive package comprising the additives disclosed herein is also contemplated by the present disclosure. The additive package may be prepared as a separate formulation to be subsequently combined with the polymer (A) to form the polymer composition of the present disclosure. Alternatively, the additives and polymer (A) may be combined for the first time during compounding. The additive package may be supplied in a concentrated form such that the amounts of each component of the polymer composition of the present disclosure as disclosed herein are achieved after combination of the additive package with polymer (A).

It has been surprisingly found that the polymer composition of the present disclosure comprising the additive package disclosed herein provides a thermoplastic material having one or more of the following advantageous properties: good melt and flow behaviour; cold-water solubility; good thermal processability; ability to be compounded into pellets, granules, and filaments; good thermal stability, particularly resistance to discolouration, degradation and/or decomposition during repeat thermal processing operations. Additionally, it has been found that the polymer compositions of the present disclosure have good compatibility with 3-D printing processes such as fused deposition modelling, which includes both fused filament fabrication and fused granulate fabrication. In particular, the polymer compositions of the present disclosure can be readily compounded into suitable raw materials for such process, for example as filaments having one or more of good ductility, flexibility, and tensile stress. Additional advantageous properties in respect of 3-D printing include good adhesion between printed layers, little or no bubbling, little or no warping and little or no blockage of the printing nozzle.

For ease of reference, the additives and further features of the present disclosure are now discussed under appropriate section headings. However, the teachings under each section are not limited to the section in which they are found. Unless defined otherwise, all technical and scientific terms used herein have the same meaning as commonly understood by one of ordinary skill in the art to which the disclosure belongs.

Phosphite Additive

The polymer composition of the present disclosure comprises a phosphite selected from the group consisting of formula (IV):

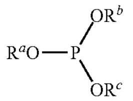

(V)

and formula (V):

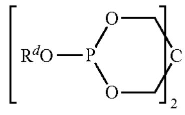

(VI)

wherein $R^a$, $R^b$, $R^c$, and $R^d$ are each independently hydrocarbyl. Such phosphite additives are commercially available, for example products sold by BASF under the “Irgafos®” trade name.

In one preferred embodiment of the present disclosure, $R^a$, $R^b$, $R^c$, and $R^d$ are each independently aryl substituted by one or more alkyl groups. In another preferred embodiment, $R^a$, $R^b$, $R^c$, and $R^d$ are each independently selected from alkyl, and phenyl substituted by one or more alkyl groups. In another preferred embodiment, $R^a$, $R^b$, $R^c$, and $R^d$ are each independently phenyl substituted by one or more butyl groups. In another preferred embodiment, $R^a$, $R^b$, $R^c$, and $R^d$ are each independently phenyl substituted by one or more tert-butyl groups.

Examples of suitable phosphite additives include bis-(2,4-di-tert-butylphenol)pentaerythritol diphosphite, bis-(2,4-di-tert-butyl-6-methylphenyl)-ethyl-phosphite, bis-(2,6-di-tert-butyl-4-methylphenyl)pentaerythritol diphosphite, and tris(2,4-di-tert-butylphenyl)phosphite. The structures of these additives are shown in the table below together with their trade names:

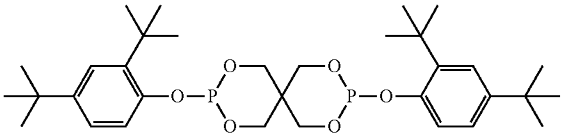

Irgafos 126
(bis-(2,4-di-tert-butylphenol)pentaerythritol diphosphite

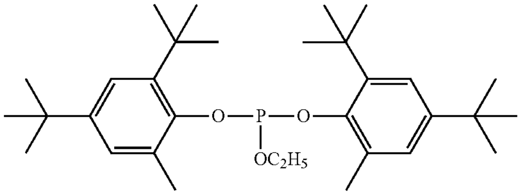

Irgafos 38
(bis-(2,4-di-tert-butyl-6-methylphenyl)-ethyl-phosphite)

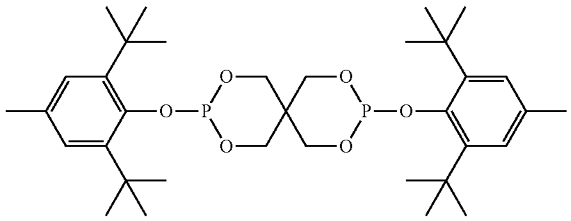

PEP 36
(bis-(2,6-di-tert-butyl-4-methylphenyl)pentaerythritol diphosphate)

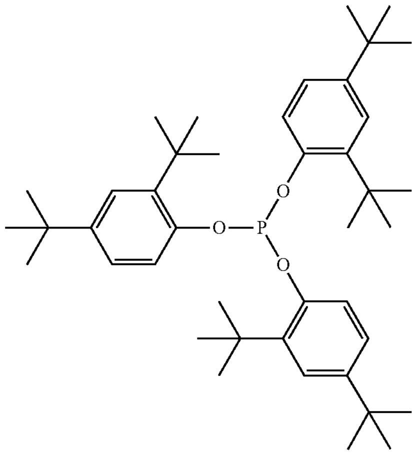

Irgafos 168
(tris-(2,4-di-tert-butylphenyl)phosphite)

In one preferred embodiment, the phosphite of the present disclosure is tris(2,4-di-tert-butylphenyl)phosphite (Irgafos 168).

Vitamin E and Epoxidised Soy Bean Oil

The polymer composition of the present disclosure contains at least one additive selected from vitamin E and epoxidised soy bean oil. Vitamin E comprises eight fat-soluble compounds that include four tocopherols and four tocotrienols. Both tocopherols and tocotrienols occur in alpha (α), beta (β), gamma (γ), and delta (δ) forms determined by the number and position of methyl groups on the chromanol ring.

The four tocopherols may be represented by the general formula:

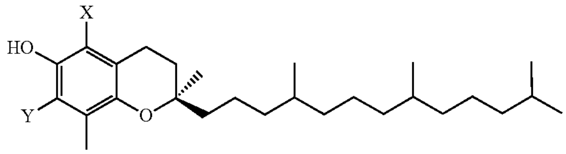

wherein for α-tocopherol X and Y are each Me; for β-tocopherol X is Me and Y is H; for γ-tocopherol X is H and Y is Me; and for δ-tocopherol X and Y are each H.

The four tocotrienols may be represented by the general formula:

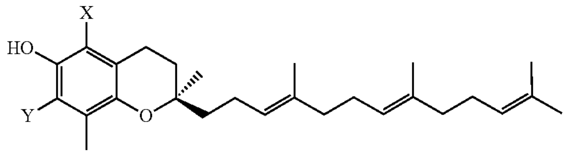

wherein X and Y are as defined above.

Vitamin E occurs naturally, and is commonly derived (extracted, purified or concentrated) from plant sources, and in particular plant oils, for example from *Triticum vulgare* (wheat) germ oil. Thus, in one preferred embodiment of the present disclosure, the vitamin E is obtained from a plant source, preferably from *Triticum vulgare*. The most abundant and most active in humans form of vitamin E is α-tocopherol. As is evident from the structure above, tocopherols contain three chiral centres, one at C2 in the chromanol ring and two in the side chain at C4' and C8'. The naturally occurring form of α-tocopherol is D-α-tocopherol (which can also be described as RRR-α-tocopherol). Vitamin E, typically as α-tocopherol, may also be synthetically prepared. In this case, synthetic vitamin E is typically prepared as a racemic mixture of α-tocopherol referred to as DL-α-tocopherol or all-rac-α-tocopherol. Synthetic α-tocopherol or α-tocopherol obtained from natural sources may also be supplied in ester form, for example as the acetate, succinate, nicotinate, and phosphate esters thereof. Thus, in one preferred embodiment of the present disclosure the vitamin E comprises D-α-tocopherol and/or esters thereof. The esters of D-α-tocopherol may be selected from the group consisting of D-α-tocopherol acetate, D-α-tocopherol succinate, D-α-tocopherol nicotinate, and D-α-tocopherol phosphate. In another preferred embodiment, the vitamin E is synthetic vitamin E, preferably DL-α-tocopherol and/or esters thereof. The esters of DL-α-tocopherol may be selected from the group consisting of DL-α-tocopherol acetate, DL-α-tocopherol succinate, DL-α-tocopherol nicotinate, and DL-α-tocopherol phosphate.

In one preferred embodiment, the vitamin E of the present disclosure may be in the form of a mixture comprising vitamin E and one or more fatty acids. The nature of the fatty acid(s) is not necessarily limited; examples include palmitic acid, palmitoleic acid, stearic acid, oleic acid, linoleic acid, alpha-linoleic acid, arachidic acid, eicosenoic acid, behenic acid and mixtures thereof. Thus, in one preferred embodiment, the vitamin E is in the form of a mixture comprising D-α-tocopherol and/or esters thereof and one or more fatty acids. In one preferred embodiment, the D-α-tocopherol and/or esters thereof is present in the mixture in an amount from about 0.1% to about 0.75%, preferably from about 0.25% to about 0.5% by weight based on the total weight of said mixture.

Vitamin E according to any of the embodiments disclosed herein may be present in the polymer composition of the present disclosure preferably in an amount of from about 0.001 to about 2% by weight, from about 0.001 to about 1% by weight, from about 0.001 to about 0.2% by weight, from about 0.01 to about 0.2% by weight, or from about 0.05 to about 0.2% by weight of the total polymer composition.

Epoxidised soy bean oil is a commercially available additive obtained from the epoxidation of soybean oil, typically by oxidation of high iodine value unsaturated soy bean oil with hydrogen peroxide and organic acids such as formic or acetic acid. Epoxidised soy bean oil is identifiable under the CAS-No.: 8013-07-8. In one preferred embodiment of the present disclosure, the polymer composition comprises epoxidised soy bean oil in an amount of from about 0.001 to about 5% by weight, from about 0.001 to about 2% by weight, from about 0.01 to about 2% by weight, from about 0.01 to about 1% by weight, or from about 0.01 to about 0.5% by weight of the total polymer composition.

In one preferred embodiment, the polymer composition of the present disclosure comprises vitamin E and epoxidised soy bean oil. Thus, each of the ranges of amounts of vitamin E disclosed above can be combined with each of the ranges of amounts of epoxidised soy bean oil disclosed above. For example, the polymer composition of the present disclosure preferably comprises from about 0.001 to about 2% by weight of vitamin E and from about 0.001 to about 5% by weight of epoxidised soy bean oil, or from about 0.05 to about 0.2% by weight of vitamin E and from about 0.01 to about 0.5% by weight of epoxidised soy bean oil.

PEG-Grafted Polyvinyl Acetate Copolymer

The polymer composition of the present disclosure comprises about 0 to about 10% by weight of a PEG-grafted polyvinyl acetate copolymer having a degree of hydrolysis of from about 30 to about 98 mole %, a weight average molecular weight (Mw) of from about 5,000 to about 40,000, and a number average molecular weight (Mn) of from about 1,000 to about 20,000. In the field of the art of the present disclosure, the PEG-grafted polyvinyl acetate copolymer may also be described as an internally plasticised polyvinyl alcohol.

In one preferred embodiment, the PEG-grafted polyvinyl acetate copolymer of the present disclosure is a graft copolymer wherein partially hydrolysed polyvinyl acetate/alcohol chains are grafted onto the backbone of a polyethylene glycol (PEG) polymer chain. A non-limiting, idealised structure of such a PEG-grafted polyvinyl acetate copolymer may be as depicted in the following formula, wherein asterisks denote attachment points to structural repeat units:

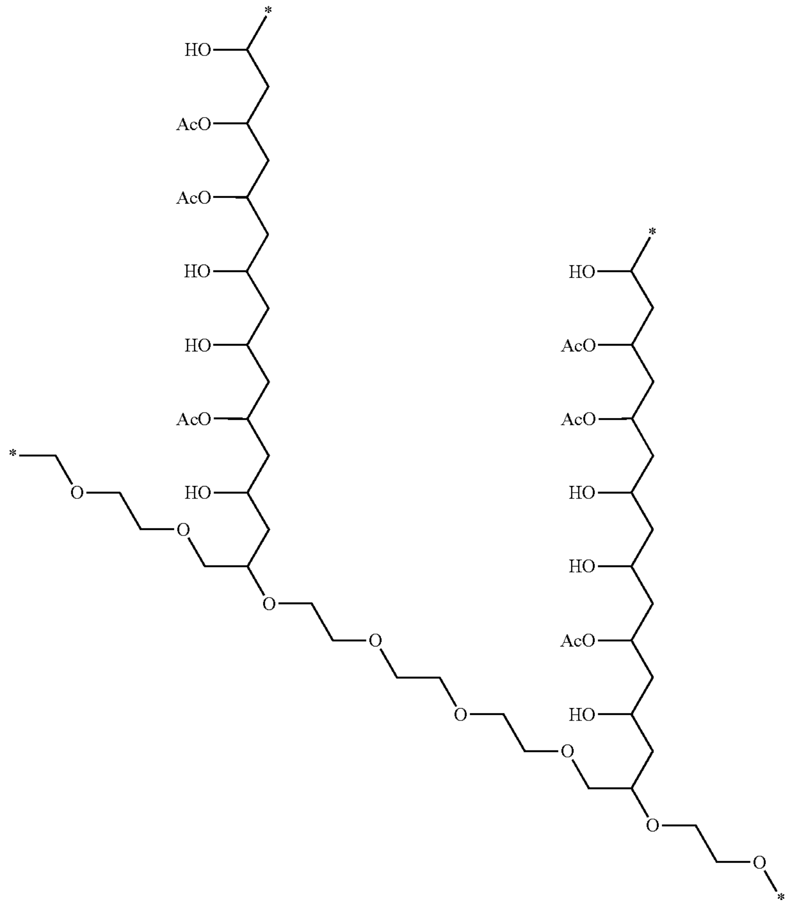

In one preferred embodiment of the present disclosure, the PEG-grafted polyvinyl acetate copolymer has a degree of hydrolysis of from about 33.0 to about 37.0 mole %, preferably 35.0 mole %. In another preferred embodiment, the PEG-grafted polyvinyl acetate copolymer has a degree of hydrolysis of from about 42.0 to about 45.0 mole %, preferably 43.0 mole %. In another preferred embodiment, the PEG-grafted polyvinyl acetate copolymer has a degree of hydrolysis of from about 78.0 to about 88.7 mole %, preferably from about 80.0 to about 88.7 mole %. In another preferred embodiment, the PEG-grafted polyvinyl acetate copolymer has a degree of hydrolysis of from about 84.0 to about 98.0 mole %, preferably from about 93.0 to about 98.0 mole %.

The PEG-grafted polyvinyl acetate copolymer may also be characterised in terms of the proportion of residual acetate repeat units in the polymer. For example, in one preferred embodiment, the PEG-grafted polyvinyl acetate copolymer has a residual acetate level of from about 20.0 to about 27.6%. In another preferred embodiment, the PEG-grafted polyvinyl acetate copolymer has a residual acetate level of from about 3.8 to about 12.8%.

The PEG-grafted polyvinyl acetate copolymer may be present in the polymer composition of the present disclosure in an amount of from about 0 to about 10% by weight, from about 0 to about 5% by weight, or from about 0 to about 2% by weight of the polymer composition. In one preferred embodiment, the PEG-grafted polyvinyl acetate copolymer may be present in the polymer composition of the present disclosure in an amount of from about 0.01 to about 10% by weight, from about 0.01 to about 5% by weight, or from about 0.01 to about 2% by weight of the polymer composition. In another preferred embodiment, the PEG-grafted polyvinyl acetate copolymer may be present in the polymer composition of the present disclosure in an amount of from about 0.1 to about 10% by weight, from about 0.1 to about 5% by weight, or from about 0.1 to about 2% by weight of the polymer composition.

In one preferred embodiment of the present disclosure, the PEG-grafted polyvinyl acetate copolymer comprises from about 1 to about 70 wt %, more preferably from about 15 to about 56 wt % of polyethylene glycol (PEG), based on the total weight of the PEG-grafted polyvinyl acetate copolymer.

PEG-grafted polyvinyl acetate copolymers suitable for use in the present disclosure are commercially available. The PEG-grafted polyvinyl acetate copolymer may in the form of an aqueous solution. In one preferred embodiment, one or more organic solvents may also be present in the aqueous solution. The nature of the organic solvent is not limited and a person skilled in the art will be able to select organic solvents compatible with the PEG-grafted polyvinyl acetate copolymer of the present disclosure. In some non-limiting examples, the organic solvent may be an alcohol such as ethanol, methanol or isopropanol. Where the PEG-grafted polyvinyl acetate copolymer is in the form of an aqueous solution, the total solids content of said solution may be from about 10 to about 60 weight %, from about 20 to about 50% weight/volume (w/v), or from about 30 to about 40% (w/v) based on the total volume of the aqueous solution.

In one preferred embodiment, a 4 wt % aqueous solution of the PEG-grafted polyvinyl acetate copolymer may have a viscosity of from about 4.5 to about 5.5 mPa·s when measured at about 23+/−0.2° C. by a Brookfield viscometer model RVT, spindle 3 with a shear rate of 20 rpm.

Further Additives

In one preferred embodiment, the polymer composition of the present disclosure comprises one or more additives in addition to those discussed above. Such additional additives may be plasticisers, for example polyhydric alcohols derivatives thereof such as glycols e.g. mono-, di-, tri- and poly-ethylene glycol, glycerol, diols, triols and polyols. Further non-limiting examples of additives that may also be present in the polymer composition include lubricants, anti-blocking agents, antifoam additives, oxidation stabilisers, melt stabilisers, pigments, dyes, fillers and further polymeric compounds. In one preferred embodiment, the polymer composition of the present disclosure further comprises a stannate salt. In one preferred embodiment, the polymer composition comprises a stannate salt selected from the group consisting of sodium stannate, calcium stannate, zinc stannate, zinc hydroxystannate, and calcium hydroxystannate. In any of the preceding embodiments, the additional additive is present in the polymer composition of the present disclosure in an amount of from about 0 to about 10% by weight, from about 0 to about 5% by weight, or from about 0 to about 2% by weight of the polymer composition.

Compositions and Processes for the Preparation Thereof

The polymer composition of the present disclosure may be further illustrated by way of the non-limiting embodiments set out in Table 1.

TABLE 1

| | Embodiment | | | | | | |
|---|---|---|---|---|---|---|---|
| Component | A | B | C | D | E | F | G |
| Polymer A (wt %)[1] | 90-99 | 90-99 | 90-99 | 90-99 | 90-99 | 90-99 | 90-99 |
| Phosphite (wt %)[2] | 0.5-5 | 0.5-5 | 0.5-5 | 0.5-5 | 0.5-5 | 0.5-5 | 0.5-5 |
| Vitamin E (wt %) | 0.001-0.2 | — | 0.001-0.2 | 0.001-0.2 | 0.001-0.2 | 0.001-0.2 | 0.001-0.2 |
| Epoxidised soy bean oil (wt %) | — | 0.001-2 | 0.001-2 | — | 0.001-2 | — | 0.001-2 |

TABLE 1-continued

| | Embodiment | | | | | | |
|---|---|---|---|---|---|---|---|
| Component | A | B | C | D | E | F | G |
| PEG-grafted polyvinyl acetate copolymer (wt %) | — | — | — | 0.1-2 | 0.1-2 | 0.1-2 | 0.1-2 |
| Stannate salt (wt %) | — | — | — | — | — | 0.1-2 | 0.1-2 |

[1]Degree of hydrolysis: 71.5-73.5 mole %
[2]Tris(2,4-di-tert-butylphenyl)phosphite (Irgafos 168)

In one preferred embodiment of the invention, water may be present in the polymer composition. Water in the composition may be present due to water present in the constituent components prior to mixing, for example, or may be added separately to the composition. In one preferred embodiment, the polymer composition of the present disclosure comprises about 10 weight % or less, about 5 weight % or less, about 2 weight % or less, about 1 weight % or less, or about 0.6 weight % or less of water, based on the total weight of the polymer composition. In another preferred embodiment, the polymer composition comprises at least about 0.1 weight % water. In another preferred embodiment, the polymer composition of the present disclosure comprises from about 0.1 weight % to about 10 weight % water, from about 0.1 weight % to about 5 weight % water, from about 0.1 weight % to about 2 weight %, from about 0.1 weight % to about 1 weight %, or from about 0.1 weight % to about 0.6 weight % water, based on the total weight of the polymer composition. In another preferred embodiment, the polymer composition comprises from about 0.4 to about 0.6 weight % water, based on the total weight of the polymer composition. Thus, any of the compositions of embodiments A to G according to Table 1 may further comprise from about 0.1 weight % to about 10 weight % water, from about 0.1 weight % to about 5 weight % water, from about 0.1 weight % to about 2 weight %, from about 0.1 weight % to about 1 weight %, or from about 0.1 weight % to about 0.6 weight % water, based on the total weight of the polymer composition.

In one preferred embodiment, it may be desired to reduce the water content of the polymer composition to a range suitable for compounding (e.g. into pellets or filaments), down-stream processing and/or 3-D printing. For example, a low water content may be preferable when preparing pellets or filaments to minimise bubble formation that may be undesirable in subsequent applications of said pellets or filaments. A person skilled in the art will be able to select methods for drying the polymer composition, this being specifically within their common general knowledge. Polymer pellets may, for example, be dried under vacuum.

Methods for determining the water content of the polymer composition of the present disclosure will also be known to a person skilled in the art. The Karl Fischer water determination method is particular useful in the context of the present disclosure and is described in more detail in ISO 15512:2019, the contents of which are hereby incorporated by reference.

The polymer compositions of the present disclosure may be compounded into various forms commonly used in the field and is not necessarily limited in this respect. The polymer composition may be compounded into any of the solid forms commonly used in the industry, and a person skilled in the art will be able to select suitable forms for down-stream processing and manufacturing. In one preferred embodiment, the polymer composition of the present disclosure may be in the form of an extrudate. Equipment suitable for the compounding and extrusion of polymers are specifically within the common general knowledge of a person skilled in the art, who will be able to select suitable equipment, and the present disclosure is not limited in this respect. In one preferred embodiment, the polymer composition may be in the form of an extruded filament, a pellet, a powder, flakes or granules. Where the polymer composition is in the form of a pellet, in a preferred embodiment the pellet may have a diameter of from about 1 to about 5, preferably from about 2 to about 4 mm.

The polymeric composition of the present disclosure has been found to be particularly amenable to thermoplastic processing. Polymer compositions may typically undergo multiple thermal processing steps when being prepared for down-stream uses. For example, a mixture of polymer and additives will typically first be compounded into a form such as pellets, flakes, or granules. In the compounding process, the polymer and one or more additives, for example as an additive package, are mixed together in a molten state before being extruded and cooled. Such forms will typically then be used in production processes, where they are again melted, for example for injection moulding or extrusion, and then cooled. Forms such as pellets, flakes, or granules may also be further compounded into other forms such as filaments for 3-D printing techniques such as fused deposition modelling, which includes both fused filament fabrication and fused granulate fabrication. Accordingly, polymer compositions are subjected to multiple cycles of melting and cooling, which can lead to degradation, decomposition, and/or discolouration if not mitigated. In particular, polyvinyl alcohols may be particular susceptible to thermally induced decomposition via mechanisms already discussed above such as oxidation and the elimination of water and acetic acid. Such decomposition reactions can lead to an undesirable discolouration (typically a yellow or amber) of the polymer. The polymer composition of the present disclosure has been found to have particularly good heat stability during multiple thermal processing steps at temperatures typically used for the processing of polyvinyl alcohols, while maintaining good melt and flow characteristics.

Further aspects of the present disclosure provide a process for preparing a composition as disclosed herein. In one preferred embodiment of the present disclosure, a pre-mix comprising the components (a) to (d) and optional further additives as disclosed herein above is first formed. The pre-mix may be prepared by mixing polymer (A) and the additives of the present disclosure together in a high-speed mixer. The polymer (A) and additives may be combined in the high-speed mixer, or the additives may first be formulated as an additive package that is then combined with the polymer (A) when forming the pre-mix.

The polymer composition of the present disclosure in the form of a pre-mix may then be extruded through a die. Equipment for extruding polymers is specifically within the common general knowledge of a person skilled in the art who will be able to select appropriate equipment. In one preferred embodiment of the present disclosure, the pre-mix is extruded from a twin screw extruder with three melt zones. It is generally preferable that the temperatures of the melt zones are below the decomposition temperature, which is typically from about 260 to about 380° C. Thus, in one preferred embodiment, the temperatures of the melt zones are independently from about 150° C. to about 240° C., preferably from about 170° C. to about 220° C. In one preferred embodiment, the extrusion speed may be from about 100 to about 200 rpm. The feed rate may be from about 0.1 to about 1 mm $s^{-1}$. The diameter of the die may be from about 1 to about 10 mm. It is typically desirable to cool the extrudate. Extruded polymers are often cooled in water, however due to the water solubility of polyvinyl alcohol polymers, in one preferred embodiment the extrudate is air-cooled. The extruded polymer composition, for example pellets, may be stored before downstream use, and in one preferable embodiment the extruded polymer is stored in moisture protective bags.

As described above, the polymer composition of the present disclosure may be extruded into a variety of forms such as pellets, granules and filaments. These forms may be subsequently processed into other forms. In one preferred embodiment, filaments may be formed directly from the pre-mix; in others, filaments may be formed from the polymer composition of the present disclosure in the form of pellets or granules. Filaments are typically used in 3-D printing processes such as fused deposition modelling, which includes both fused filament fabrication and fused granulate fabrication.

As discussed above, it may be preferable that the moisture content of the polymer composition, for example pellets, is reduced to an acceptable level before further processing such as into filaments. Thus, in a preferred embodiment the polymer composition, preferably in the form of a pellet, is dried prior to the formation of filaments. Drying may be achieved in a conventional circulating air oven and/or under vacuum. Water content may be determined by the Karl Fischer method as discussed herein above. Dried pellets may be stored in moisture protective bags, which may contain silica desiccant.

Filaments may be prepared from pellets (preferably dried as detailed above) by transferring said pellets to a single screw extruder which as four melting zones. One non-limiting example of such an extruder is the 3devo Composer 350. The temperature of the melt zones may vary depending on the melting temperature of the pellets and a person skilled in the art will be able to select appropriate temperatures on this basis. In a preferred embodiment, the temperature of the melt zones are independently from about 150° C. to about 240° C., preferably from about 160° C. to about 200° C. The screw speed may be from about 3 to about 8 rpm, and cooling fan power may be from about 0 to about 100%. In preferred embodiments, water cooling is avoided. Thus, in preferred embodiments the extruded filament is air cooled. As the filament is extruded from the extruder nozzle, the filament may be placed between puller wheels to achieve the desired filament diameter. In a preferred embodiment, the diameter of the filament may be from about 1 to about 5 mm, preferably from about 2 to about 4 mm. Filaments are typically wound on to a spool for storage and distribution to end users.

The polymer composition of the present invention may be useful in a broad range of industrial applications and is not limited in this respect. Polyvinyl alcohol-based polymers are attractive for use in 3-D printing as they are non-toxic, water-soluble and biodegradable. Polyvinyl alcohol-based polymers are commonly used as support materials for the 3-D printing of intricate and complex 3-D geometries. Thus, in further aspects present disclosure provides the use of a composition as disclosed herein in 3-D printing. In particular, the polymer composition of the present disclosure may be used as a water-soluble support in 3-D printing. In further aspects of the present disclosure, 3-D printed articles prepared from the compositions disclosed herein are also provided. The present disclosure is not limited with respect to specific 3-D printing techniques and the polymer composition disclosed herein may, for example, be used in fused deposition moulding or fused granulate fabrication. In either or both of fused deposition moulding and fused granulate fabrication, it may be preferable to dry pellets or filaments comprising the polymer composition of the present disclosure before commencing printing. Thus, the pellet and filament may be dried, for example in a conventional circulating air oven. In a preferred embodiment, the oven temperature may be from about 35 to about 60° C. Thus, the pellet or filament may comprise from about 0.1 weight % to about 10 weight % water, from about 0.1 weight % to about 5 weight % water, from about 0.1 weight % to about 2 weight %, from about 0.1 weight % to about 1 weight %, or from about 0.1 weight % to about 0.6 weight % water, based on the total weight of the polymer composition. In another preferred embodiment, the pellet or filament comprises from about 0.4 to about 0.6 weight % water, based on the total weight of the polymer composition.

A person skilled in the art will be able to select appropriate printing temperatures. In particular, the skilled person will be able to select temperatures that minimise decomposition and/or decolouration of the polymer composition. Thus, in a preferred embodiment, the nozzle temperature for 3-D printing may be less than or equal to about 250° C. In a further preferred embodiment, the nozzle temperature for 3-D printing may be from about 160 to about 250° C.

In applications such as 3-D printing, it may be desirable to remove printed support structures comprising polyvinyl alcohol-based polymers with minimal or no heating and/or agitation or mixing. This reduces the complexity of the procedure by removing the need for mixing and heating apparatus, and may also be more energy efficient. In amateur use, the ability to dissolve support structures in tap water without the need for agitation or mixing may be particularly desirable. The polymer composition of the present disclosure has been found to have good cold-water solubility, and that mixing may not be necessary to achieve dissolution. The temperature for dissolution of polyvinyl alcohols will typically be set below the cloud point for the specific polymer, and as already discussed, it is generally preferred that the polymer be cold-water soluble, that is soluble at ambient or below-ambient temperatures. A person skilled in the art will be able to select suitable temperatures for dissolution without undue burden. Thus, in one preferred embodiment, the polymer composition of the present disclosure is soluble in water having a temperature of from about 5 to about 30° C., preferably from about 5 to about 25° C., preferably from about 5 to about 15° C., preferably about 10° C. Moreover, it will often be desirable that the support structure should be dissolved after immersion in water within a practical timescale, and/or without leaving a residue. For example, in one preferred embodiment the polymer composition of the present disclosure dissolves in water having a temperature of from about 5 to about 25° C. in less than 24 hours. In another preferred embodiment, the polymer composition of the present disclosure dissolves in water having a temperature of from about 5 to about 25° C. in less than 6 hours, more preferably in less than 4 hours. In another preferred embodiment, the polymer composition of the present disclosure dissolves in water having a temperature of from about 5 to about 15° C. in less than 24 hours, more preferably in less than 6 hours, even more preferably in less than 4 hours. In another preferred embodiment, the polymer composition of the present disclosure dissolves in water having a temperature of about 10° C. in less than 24 hours, less than 6 hours, or less than 4 hours. In any of the above embodiments, it may further be preferable that the polymer composition dissolves without mixing.

In 3-D printing, there are number of further desirable attributes in starting materials such as polymer pellets and filaments. For instance, it is desirable that the polymer can be printed without defects arising in the printed material such as bubbles/foaming. Additionally, it is generally also desirable that the printed structure should retain its shape after printing and cooling without warping. Good adhesion between printed layers is also generally desirable. During the printing process, further properties of the polymer raw material, e.g. filament, such as the smoothness and roundness may have an effect on the quality of the printed article. Thus, filaments with a smooth surface, regular circular cross-section and/or consistent diameter may be preferred. In the case of filaments, it is also generally desirable that the filament can pass through the printing nozzle smoothly without causing blockage. Moreover, it will generally be desirable that the filament has a suitable flexibility and tensile stress for the 3-D printing process, for example such that the filament does not snap due to brittleness during printing. The polymer compositions of the present disclosure have been found to have good performance in one or more of the above characteristics as well as maintaining good melt and flow behaviour and water-solubility.

Notwithstanding uses in 3-D printing, the polymer composition of the present disclosure may also find utility in packaging, films, coatings, or water-soluble tooling. In such applications, polyvinyl alcohol-based polymers may be particularly attractive due to their water-solubility, low permeability to gases such as oxygen, resistance to organic solvents, non-toxicity, and biodegradability.

Having generally described this disclosure, a further understanding can be obtained by reference to certain specific examples illustrated below which are provided for purposes of illustration only and are not intended to be all inclusive or limiting unless otherwise specified.

Examples

Formulations according to Table 2 were prepared according to the general procedures set out below.

General Procedure for Compounding into Pellets

The components in the amounts indicated in Table 2 were combined and thoroughly mixed in a high-speed mixer. The resulting pre-mix composition was transferred to a twin screw extruder with 3 melt zones, with temperatures of 160-220° C. The feed rate was 0.1-1 mm s-1, and the speed was 100-200 rpm. The extrudate was extruded through a 5 mm diameter die and air cooled. The resulting pellets were approximately 2-4 mm in size. The pellets were stored in moisture-protective bags.

General Procedure for Preparing Filaments

The 2-4 mm pellets prepared by the preceding method were dried in a conventional circulating air oven for several hours until an acceptable moisture content was achieved, which was considered to be less than 0.6 wt %. Moisture content was checked using an automatic Coulometric KF Titrator C30 from Mettler which heats the sample in pellet form in a sealed sample jar to 150° C. before extracting and titrating any vapour against HYDRANAL to determine the moisture content. Once dried, pellets could be stored in moisture-protective bags containing silica sachets so that no further drying was required when material was taken from fresh bags. The bags were stored indoors under dry conditions and open bags were resealed after use.

Dried pellets were transferred to a single screw extruder having 4 melting zones with temperatures between 160-200° C., which was determined based on the melting point of the pellets, which varied from 150-180° C. Screw speeds of 3 to 8 rpm were used and cooling fans were used as necessary. Water cooling was avoided. After extrusion from the nozzle of the extruder, the filament was placed between puller wheels to achieve a filament having 2.85 mm diameter. The filament was then wound on to a spool.

TABLE 2

| | Example | | | | | | | | | | | |
|---|---|---|---|---|---|---|---|---|---|---|---|---|
| Component | 1 | 2 | 3 | 4 | 5 | 6 | 7 | 8 | 9 | 10 | 11 | 12 |
| Polymer A (wt %)[1] | 91 | 94 | — | 94 | 96 | 95 | 96 | 96 | — | 96.05 | 96.05 | 96.85 |
| Polymer A (wt %)[2] | — | — | 94 | — | — | — | — | — | 96 | — | — | — |
| Phosphite (wt %)[3] | 2 | 2 | 2 | 2 | 2 | 2 | 2 | 2 | 2 | 2 | 2 | 2 |
| Vitamin E (wt %) | — | — | — | — | — | — | 0.1 | — | 0.1 | — | 0.1 | 0.1 |
| Epoxidised soy bean oil (wt %) | — | | — | — | — | — | — | 0.1 | — | 0.05 | 0.05 | 0.05 |

TABLE 2-continued

| | Example | | | | | | | | | | | |
|---|---|---|---|---|---|---|---|---|---|---|---|---|
| Component | 1 | 2 | 3 | 4 | 5 | 6 | 7 | 8 | 9 | 10 | 11 | 12 |
| PEG-grafted polyvinyl acetate copolymer (wt %) | — | 2 | 2 | 2 | — | — | 1.9 | 1.9 | 1.9 | 1.9 | 1.8 | 1 |
| Other additives (wt %) | 7[a] | 2[b] | 2[b] | 2[c] | 2[b] | 3[d] | — | — | — | — | — | — |

[1]Degree of hydrolysis: 71.5-73.5 mole %
[2]Degree of hydrolysis: 76.0-79.0 mole %
[3]Tris(2,4-di-tert-butylphenyl)phosphite (Irgafos 168)
[a]5 wt % PEG8000 and 2 wt % Irganox 1010
[b]2 wt % Irganox 1010
[c]2 wt % Flamtard S
[d]1 wt % PEG8000 and 2 wt % Irganox 1010

The melt flow index (MFI) of the formulations was measured according to ISO 1133, for which the contents of said test specification are incorporated herein. MFI was measured using a Davenport Automatic flow-rate time test machine. The determination measures the material extruded through a specified die in a vertical barrel with a dead load of 2.16 or 5 kg applied to the top of the piston. The material is loaded into the barrel at the test temperature, and given a time to melt and consolidate before the extruded material is collected and weighed. The period for collection is 1 minute and 5 replicates were performed. The average of the 5 replicates was calculated and the result reported in g/10 min.

At 190° C., the formulations according to the present invention were found to have good melt and flow behaviour and minimal discolouration/degradation. Formulations outside the scope of the present invention exhibited MFI values that were unstable over time, as well as degradation/discolouration.

Water Solubility

To evaluate water solubility, 3-5 g of pellets comprising the formulations of Table 2 were weighed and transferred to a jar that was filled with 300 mL of tap water. Vigorous stirring was applied at 500 rpm and the solution was monitored. The time between the start of solubilisation (determined as the point when a colour change of the tap water was observed) and complete dissolution was measured. Swelling of the pellets was observed during the first 10-20 minutes and qualitative observations were made based on visual observation. Filaments can also be measured by clamping the filament and immersing into the water before measuring dissolution time and swelling as defined above.

Performance was compared to a benchmark, wherein the benchmark dissolution time was 145 min for full dissolution, and 10 min for swelling. Good performance was considered to be exhibited where measured values were approximately equal to or less than the benchmark time. Dissolution and swelling was also measured after heat treatment at 190° C. The results of the measurements are summarised in Table 3.

TABLE 3

| Example | Before heat treatment (min) | After heat treatment (min) | Swelling before heat treatment (min) | Swelling after heat treatment (min) |
|---|---|---|---|---|
| 1 | ND | ND | ND | ND |
| 2 | 110 | 180 | 5 | 2 |
| 3 | 75 | 210 | 10 | 2 |

TABLE 3-continued

| Example | Before heat treatment (min) | After heat treatment (min) | Swelling before heat treatment (min) | Swelling after heat treatment (min) |
|---|---|---|---|---|
| 4 | 110 | 180 | 15 | 2 |
| 5 | 110 | 300 | 5 | 2 |
| 6 | 120 | 300 | 2 | 10 |
| 7 | 180 | 180 | 10 | 5 |
| 8 | 110 | 180 | 10 | 5 |
| 9 | 150 | 285 | 10 | 2 |
| 10 | 144 | ND | 10 | ND |
| 11 | 143 | ND | 10 | ND |
| 12 | Did not fully dissolve | ND | 15 | ND |

ND: Not determined

3D-Printing Trials

Filament prepared as detailed above was printed in a fused deposition modelling printer. The printing temperature was from 160-250° C., and filaments with a moisture content of 0.5-0.6 wt % were used. The bed temperature was from room temperature to 60° C. The 3D-printing performance of filaments containing the formulations of each of Examples 1 to 12 was rated qualitatively based on ability to print, filament shape, and the quality of the printed material (e.g. the presence of defects such as bubbles). These observations are summarised in Table 4.

TABLE 4

| Example | Observations |
|---|---|
| 1 | Attempts to print were unsuccessful |
| 2 | Printed successfully, but with significant amount of bubbling |
| 3 | Printed successfully, but with significant amount of bubbling |
| 4 | Printed successfully, with some bubbling; filament shape was poor |
| 5 | Printed successfully, with some bubbling; good filament shape |
| 6 | Attempts to print were unsuccessful |
| 7 | Printed successfully, minimal bubbling; good filament shape |
| 8 | Printed successfully, minimal bubbling; good filament shape |
| 9 | Printed successfully, minimal bubbling; good filament shape |
| 10 | Printed successfully, a few bubbles; good filament shape |
| 11 | Printed successfully, a few bubbles; good filament shape |
| 12 | Printed successfully, a few bubbles; good filament shape |

Accordingly, formulations in accordance with the present invention were found to give good performance in fused deposition modelling, which includes both fused filament fabrication and fused granulate fabrication (3D printing).

Tensile Performance of Filaments

The tensile performance of filaments comprising the formulations of Table 2 was measured based on the methods disclosed in ASTM D638-14 and ISO527-2, the contents of which are incorporated by reference. Specifically, a 5 kN load cell was used and approximately 14 cm of each filament was cut for a 10 cm gauge length to be analysed, following ASTM D638-14 and using the rod specimen as a reference. Sample diameters were recorded and added to the method before commencing testing. Measurements were performed in a temperature controlled room at 20° C. Samples were dried at 60° C. for 5 h, then kept in a desiccator before testing. The mean tensile stress at break values are summarised in Table 5.

TABLE 5

| Example | Mean tensile stress at break (MPa) | Coefficient of Variation (%) |
|---|---|---|
| 2 | 31.25 | 31.64 |
| 3 | 15.71 | 8.63 |
| 4 | 24.11 | 20.11 |
| 5 | 37.97 | 5.13 |
| 7 | 42.29 | 8.69 |
| 8 | 34.64 | 5.33 |
| 9 | 34.07 | 13.17 |

Examples 5, 7, 8, and 9 were considered to have good performance based on tensile stress at break. Examples 2, 3, and 4 were considered too ductile as interpreted from the stress/strain curve.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims

The invention claimed is:

1. A thermally extrudable polymer composition comprising, based in each case on the total weight of said polymer composition:

(a) about 60 to about 99% by weight of a polymer (A), wherein polymer (A) comprises, based in each case on the total number of moles of polymer (A):

(i) from about 66 to about 79 mole % of structural units of formula (I):

(I)

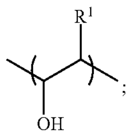

and (ii) from about 10 to about 34 mole % of structural units of formula (II):

(II)

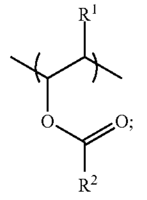

wherein each $R^1$ is independently hydrogen or alkyl, each $R^2$ is independently alkyl; and wherein the polymer (A) has a weight average molecular weight (Mw) of from about 26,000 to about 87,000 and a number average molecular weight (Mn) of from about 4,000 to about 45,000;

(b) about 0.05 to about 10% by weight of a phosphite selected from the group consisting of formula (V):

(V)

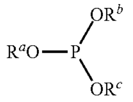

and formula (VI):

(VI)

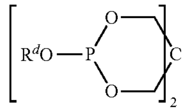

wherein $R^a$, $R^b$, $R^c$, and $R^d$ are each independently hydrocarbyl;

(c) at least one additive selected from:

(i) vitamin E; and (ii) epoxidised soy bean oil; and (d) about 0 to about 10% by weight of a PEG-grafted polyvinyl acetate copolymer, wherein the polyvinyl acetate copolymer has a degree of hydrolysis of from about 30 to about 98 mole %, a weight average molecular weight (Mw) of from about 5,000 to about 40,000, and a number average molecular weight (Mn) of from about 1,000 to about 20,000.

2. The polymer composition of claim 1, wherein the composition comprises from about 90 to about 99 weight % of polymer (A).

3. The polymer composition of claim 1, wherein $R^1$ is H.

4. The polymer composition of claim 1, wherein $R^2$ is Me.

5. The polymer composition of claim 1, wherein the polymer (A) comprises from about 21 mole % to about 34 mole % of structural units of formula (II).

6. The polymer composition of claim 1, wherein the polymer (A) comprises from about 70.0 to about 74.0 mole % of structural units of formula (I).

7. The polymer composition of claim 1, wherein the polymer (A) comprises from about 75.0 to about 79.0 mole % of structural units of formula (I).

8. The polymer composition of claim 1, wherein the PEG-grafted polyvinyl acetate copolymer comprises from about 1 to about 70 wt % of PEG.

9. The polymer composition of claim 1, wherein the PEG-grafted polyvinyl acetate copolymer is in the form of an aqueous solution.

10. The polymer composition of claim 1, wherein the PEG-grafted polyvinyl acetate copolymer has a degree of hydrolysis of from about 33.0 to about 45.0 mole %.

11. The polymer composition of claim 1, wherein the PEG-grafted polyvinyl acetate copolymer has a degree of hydrolysis of from about 78.0 to about 88.7 mole %.

12. The polymer composition of claim 1, wherein the PEG-grafted polyvinyl acetate copolymer has a degree of hydrolysis of from about 84.0 to about 98.0 mole %, preferably wherein the PEG-grafted polyvinyl acetate copolymer has a degree of hydrolysis of from about 93.0 to about 98.0 mole %.

13. The polymer composition of claim 1, wherein $R^a$, $R^b$, $R^c$, and $R^d$ are each independently aryl substituted by one or more alkyl groups.

14. The polymer composition of claim 1, wherein the phosphite is selected from the group consisting of: bis-(2,4-di-tert-butylphenol)pentaerythritol diphosphite, bis-(2,4-di-tert-butyl-6-methylphenyl)-ethyl-phosphite, bis-(2,6-di-tert-butyl-4-methylphenyl)pentaerythritol diphosphite, and tris(2,4-di-tert-butylphenyl)phosphite.

15. The polymer composition of claim 1, wherein the composition comprises vitamin E and epoxidised soy bean oil.

16. The polymer composition of claim 1, wherein the composition comprises vitamin E in an amount of from about 0.001 to about 2% by weight.

17. The polymer composition of claim 1, wherein the composition comprises epoxidised soy bean oil in an amount of from about 0.001 to about 5% by weight.

18. The polymer composition of claim 1, wherein the vitamin E is in the form of a mixture comprising D-α-tocopherol and/or esters thereof and fatty acids.

19. The polymer composition of claim 18, wherein the mixture comprising D-α-tocopherol or esters thereof and fatty acids is obtained from a plant source.

20. The polymer composition of claim 1, wherein the vitamin E is synthetic vitamin E.

21. The polymer composition of claim 1, wherein said polymer composition comprises from about 0.1 to about 10 wt % of water.

22. The polymer composition of claim 1, wherein the composition is in the form of an extrudate.

23. The polymer composition of claim 1, wherein the composition is in the form of an extruded filament, a pellet, a powder, flakes, or granules.

24. The polymer composition of claim 23, wherein the composition is in the form of a pellet having a diameter of from about 2 to about 4 mm.

25. A thermally extrudable polymer composition comprising, based in each case on the total weight of said polymer composition:

(a) about 60 to about 99% by weight of a polymer (A) which is a polyvinyl alcohol having a degree of hydrolysis of from about 66 to about 79%, wherein the polymer (A) has a weight average molecular weight (Mw) of from about 26,000 to about 87,000 and a number average molecular weight (Mn) of from about 4,000 to about 45,000;

(b) about 0.05 to about 10% by weight of a phosphite selected from the group consisting of formula (V):

(V)

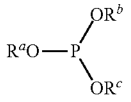

and formula (VI):

(VI)

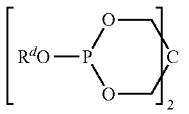

wherein $R^a$, $R^b$, $R^c$, and $R^d$ are each independently hydrocarbyl;

(c) at least one additive selected from:

(i) vitamin E; and (ii) epoxidised soy bean oil; and (d) about 0 to about 10% by weight of a PEG-grafted polyvinyl acetate copolymer, wherein the polyvinyl acetate copolymer has a degree of hydrolysis of from about 30 to about 98 mole %, a weight average molecular weight (Mw) of from about 5,000 to about 40,000, and a number average molecular weight (Mn) of from about 1,000 to about 20,000.

26. The polymer composition of claim 25, wherein polymer (A) is a polyvinyl alcohol having a degree of hydrolysis of from about 70 to about 74%.

27. The polymer composition of claim 25, wherein polymer (A) is a polyvinyl alcohol having a degree of hydrolysis of from about 75.0 to about 79.0%.

28. A water-soluble support for 3-D printing comprising a composition according to claim 1.

29. A process for preparing a composition according to claim 1, said process comprising forming a pre-mix of components (a) to (d), and extruding said pre-mix through a die.

30. A process according to claim 29 wherein the pre-mix is extruded from a twin screw extruder with three melt zones;

wherein:

the temperatures of the melt zones are independently from about 170° C. to about 220° C.;

the extrusion speed is from about 100 to about 200 rpm;

the feed rate is from about 0.1 to about 1 mm $s^{-1}$; or the diameter of the die is from about 1 to about 10 mm.

31. A process for preparing a filament, said process comprising extruding pellets prepared by the process of claim 29 from a single screw extruder;

wherein:

the extruder has 4 melt zones, the temperatures of the melt zones being independently from about 170° C. to about 220° C., and the screw speed is from about 3 to about 8 rpm.

32. A process according to claim 29 wherein the extrudate and filament is air-cooled.

33. A 3-D printed article prepared from a composition according to claim 1.

* * * * *